United States Patent
Scott

(10) Patent No.: US 11,587,008 B2
(45) Date of Patent: *Feb. 21, 2023

(54) WORKFLOW MANAGEMENT VIA BLOCK CHAINS

(71) Applicant: INTUIT INC., Mountain View, CA (US)

(72) Inventor: Glenn C. Scott, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/316,820

(22) Filed: May 11, 2021

(65) Prior Publication Data

US 2021/0279656 A1    Sep. 9, 2021

Related U.S. Application Data

(63) Continuation of application No. 15/666,792, filed on Aug. 2, 2017, now Pat. No. 11,037,082.

(51) Int. Cl.
*G06Q 10/06* (2012.01)
*G06Q 10/10* (2012.01)
(Continued)

(52) U.S. Cl.
CPC ..... *G06Q 10/0633* (2013.01); *G06Q 10/1053* (2013.01); *H04L 9/0643* (2013.01);
(Continued)

(58) Field of Classification Search
USPC ...................................................... 705/7.27
See application file for complete search history.

(56) References Cited

U.S. PATENT DOCUMENTS

| 2014/0067457 A1* | 3/2014 | Nagendra | G06Q 10/06 |
| | | | 705/7.27 |
| 2016/0260171 A1* | 9/2016 | Ford | G06Q 20/389 |

(Continued)

FOREIGN PATENT DOCUMENTS

| CN | 109417483 A * | 3/2019 | ........... H04L 9/0637 |
| WO | 2017/098519 A1 | 6/2017 | |

OTHER PUBLICATIONS

Xu, Xiwei, A Taxonomy of Blockchain-Based Systems for Architecture Design, 2017, IEEE Computer Society, pp. 243-252 (Year: 2017).*

(Continued)

*Primary Examiner* — Brian M Epstein
*Assistant Examiner* — Kristin E Gavin
(74) *Attorney, Agent, or Firm* — Patterson + Sheridan, LLP

(57) ABSTRACT

Techniques are disclosed for managing workflows using block chains. An entire workflow may be stored as a finite state machine on a block chain. Each data block of the block chain may correspond to a state and related operation of a workflow. Each data block of the block chain may be used as an input to a subsequent state of the workflow. Thus, any input may be used to compute the workflow even if the input is not designed to be used by a workflow. Nested block chains, each corresponding to a different workflow or different part of a workflow may be used to increase performance of computing the workflows.

20 Claims, 6 Drawing Sheets

(51) Int. Cl.
*H04L 9/06* (2006.01)
*H04L 9/32* (2006.01)
*H04L 9/00* (2022.01)
*G06Q 10/0633* (2023.01)
*G06Q 10/1053* (2023.01)

(52) U.S. Cl.
CPC ....... *H04L 9/3239* (2013.01); *G06Q 2220/00* (2013.01); *H04L 9/50* (2022.05); *H04L 2209/56* (2013.01)

(56) References Cited

U.S. PATENT DOCUMENTS

| | | |
|---|---|---|
| 2016/0292672 A1 | 10/2016 | Fay et al. |
| 2017/0039330 A1 | 2/2017 | Tanner, Jr. et al. |
| 2017/0262778 A1* | 9/2017 | Ganesan ............ G06Q 10/0633 |
| 2018/0150835 A1 | 5/2018 | Hunt et al. |
| 2018/0167198 A1* | 6/2018 | Muller ................. H04L 9/0825 |
| 2018/0218003 A1* | 8/2018 | Banga ................... G06F 16/137 |
| 2018/0253702 A1 | 9/2018 | Dowding |
| 2018/0341910 A1 | 11/2018 | Broveleit |
| 2018/0365686 A1 | 12/2018 | Kondo |

OTHER PUBLICATIONS

Weber Ingo et al.; "Untrusted Business Process Monitoring and Execution Using Blockchain", Sep. 8, 2016, Network and Parallel Computing Science.

Hull, Richard et al.; "Towards a Shared Ledger Business Collaboration Language Based on Data-Aware Processes", Sep. 20, 2016, Network and Parallel Computing Science.

Wikipedia: "Blockchain", Mar. 28, 2017, Retrieved from the Internet: URL:https://en.wikipedia.org/w/index.php?title=Blockchain&oldid=772718120.

International Search Report and Written Opinion dated Oct. 26, 2017 for Application No. PCT/US2017/045125.

* cited by examiner

| Current State | Operation | New State |
|---|---|---|
| init: | Workflow.create(workflow, invoice) | start |
| start: | SimpleInvoice.accept(signature=Ysignature) | accepted |
| accepted: | SimpleInvoice.shipped(manifestData=<data>, signature=Xsignature) | shipped |
| shipped: | SimpleInvoice.received(signature=Ysignature) | received |
| received: | SimpleInvoice.pay(signature=Xsignature) | pay |
| pay: | SimpleInvoice.received(tracking=<data> signature=Ysignature) | paid |
| paid: | SimpleInvoice.paid(signature=Xsignature) | complete |
| complete: | | |

FIG. 2

WORKFLOW MANAGEMENT VIA BLOCK CHAINS

CROSS REFERENCE TO RELATED APPLICATIONS

This Application is a continuation of and hereby claims priority under 35 U.S.C. § 120 to pending U.S. patent application Ser. No. 15/666,792, filed on Aug. 2, 2017, the contents of which are incorporated herein by reference in their entirety.

FIELD

Embodiments presented herein generally relate to techniques for managing workflows using block chains. More specifically, embodiments presented herein provide techniques for increasing the efficiency of processing workflows based on attestations of successful completion of a previous workflow operation.

DESCRIPTION OF THE RELATED ART

Workflow management is involves the administration of a set of states, conditions, or requirements to complete a task. A workflow may include any activity that involves a set of steps to be completed in a particular order. For example, a workflow may include a process to hire a new employee. In that case, a human resources (HR) group may complete certain forms, a facilities group may prepare an office for the new employee, a group within the hiring company may be notified about the new employee, etc.

Some workflows are simple while other workflows are complex. A simple workflow may involve deactivating a lock at a certain time of day. A more complex workflow may involve assembling an airplane. Typical workflow management techniques involve a life-cycle of a particular process. Thus, a workflow may be improved until a new process is created. However, improving a complex workflow may not be possible due to complexities of the workflow. For example, improvements to a workflow for assembling an airplane may be limited by the number of pieces to be assembled. Further, determining a current state of the workflow may be difficult due to the number of steps to assemble the airplane.

SUMMARY

One embodiment presented herein includes a computer implemented method which generally includes obtaining a workflow specification and data related to the workflow specification, the workflow specification comprising one or more states and one or more operations, each operation corresponding to at least one of the one or more states. The method may also include generating a block chain for the workflow specification comprising at least a first data block. The method may also include storing the workflow specification and data related to the workflow specification in the first data block. The method may also include, for each of the one or more states, identifying an operation corresponding to a current state of the workflow, performing the operation, appending a data block to the block chain, the appended data block including a reference to the first data block and a reference to a data block preceding the appended data block and transitioning from the current state to a next state.

Another embodiment presented herein includes a computer-readable storage medium storing instructions, which, when executed on a processor, perform an operation to manage workflows. The operation generally includes obtaining a workflow specification and data related to the workflow specification, the workflow specification comprising one or more states and one or more operations, each operation corresponding to at least one of the one or more states. The operation may also include generating a block chain for the workflow specification comprising at least a first data block. The operation may also include storing the workflow specification and data related to the workflow specification in the first data block. The operation may also include, for each of the one or more states, identifying an operation corresponding to a current state of the workflow, performing the operation, appending a data block to the block chain, the appended data block including a reference to the first data block and a reference to a data block preceding the appended data block and transitioning from the current state to a next state.

Still another embodiment presented herein includes system having a processor and a memory hosting an application, which, when executed on the processor performs an operation to manage workflows. The operation generally includes obtaining a workflow specification and data related to the workflow specification, the workflow specification comprising one or more states and one or more operations, each operation corresponding to at least one of the one or more states. The operation may also include generating a block chain for the workflow specification comprising at least a first data block. The operation may also include storing the workflow specification and data related to the workflow specification in the first data block. The operation may also include, for each of the one or more states, identifying an operation corresponding to a current state of the workflow, performing the operation, appending a data block to the block chain, the appended data block including a reference to the first data block and a reference to a data block preceding the appended data block and transitioning from the current state to a next state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 2 illustrates an example workflow specification, according to one embodiment.

DETAILED DESCRIPTION

Figure 1:
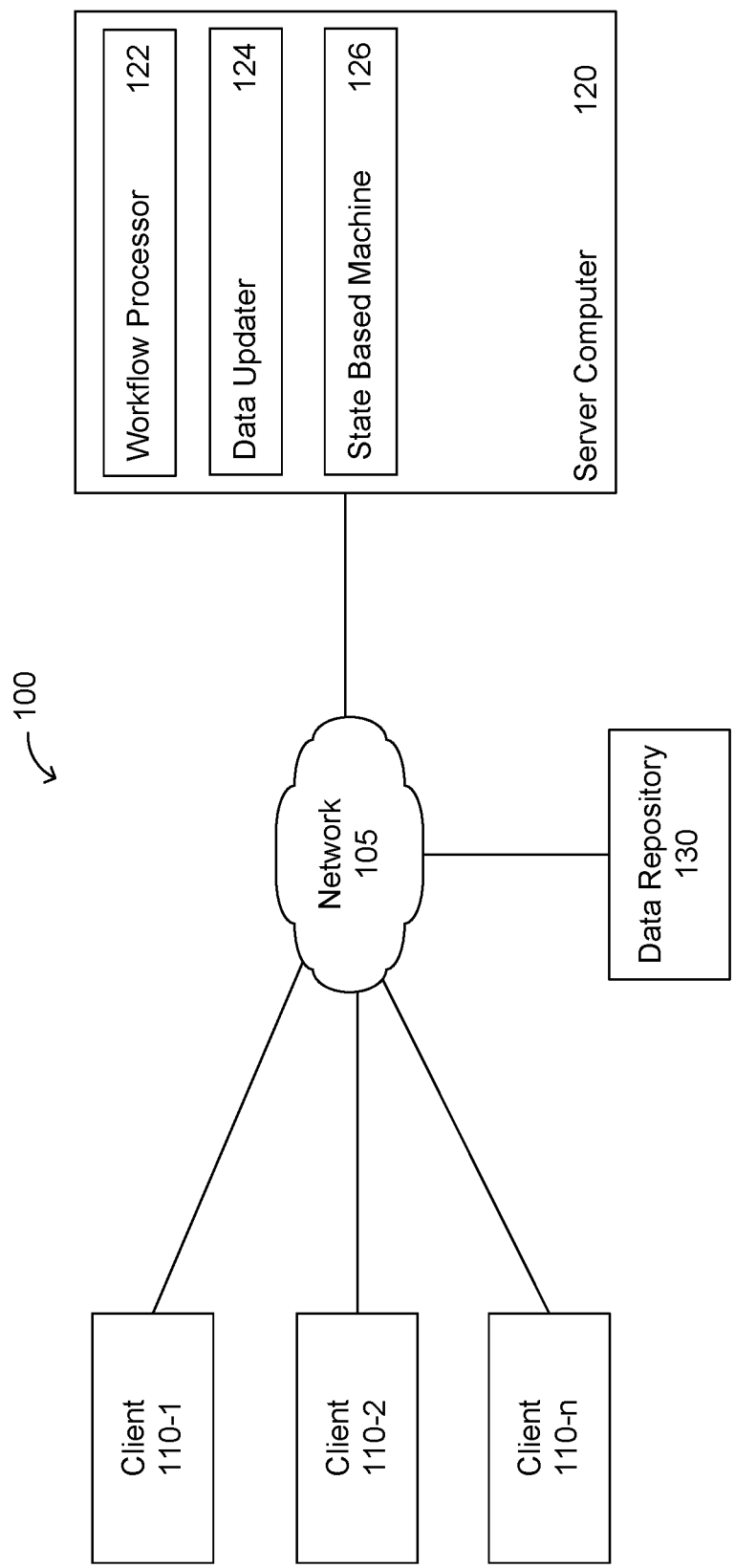
FIG. 1 illustrates an example computing environment, according to one embodiment.

Embodiments presented herein provide techniques for determining application experience of a user based on eye tracking data of the user. More specifically, embodiments presented herein can determine the quality of an experience of the user regarding application content and intervene (e.g., to reduce the likelihood of the user discontinuing use of the application) if the determined experience satisfies any predefined intervention conditions.

Embodiments presented herein provide techniques for managing workflows using block chains. More specifically, embodiments presented herein provide techniques for generating a block chain for a workflow and managing state transitions of the workflow using data stored on the block chain.

As discussed herein, a workflow processor obtains a workflow specification and any data related to the workflow. The workflow specification may include the finite number of states of the workflow, an operation performed in each state to transition to a subsequent state, and a subsequent state for each of the finite number of states. The workflow specification may be represented a finite state machine. That is, the workflow and a corresponding block chain may be in one of a finite number of states at a given time. An input for a given operation of the workflow may include an attestation that a previous state or operation has occurred. Thus, any input may be used to perform the workflow even if the input is not designed for a workflow.

An output from a given state of the workflow may be determined based on both a current state of the workflow and one or more current inputs to the workflow. For example, the workflow may be represented by a Mealy machine. In general, a Mealy machine is a finite state machine with an output from a give state determined based on both a current state and a current input.

Data related to the workflow may include data needed to initiate the workflow. The data related to the workflow may be different for each workflow. For example, a given workflow may correspond to steps to assemble an airplane. The data related to the workflow may identify each piece of the plane to be assembled. The pieces of an airplane to be assembled may be different that data related to a workflow for signing a document.

The obtained workflow specification may be one of many workflow specifications managed by a block chain. Generally, a block chain is a data structure that records data. Each update to the data in the block chain may be stored in a new block or link in the block chain. Each new block may be cryptographically bound to a previous data block in the block chain. Once data is appended to the block chain, that data cannot be modified without damaging one or more links in the block chain. Thus, validity of the data in the block chain may be analyzed by checking the cryptographic bindings between the data blocks. Any modification of the data in the block chain may be readily detected and can be remedied.

Once the workflow is obtained, the workflow processor may execute operations of the workflow. Each operation of the workflow may correspond to a state of the workflow and block chain. At each state (i.e., step) of the workflow an input may be received which indicates that an operation corresponding to a previous state has been completed. Thus, once an operation is performed in a given state, the workflow processor may provide an attestation that the given state occurred.

Upon the completion of each operation and corresponding state of the workflow, a data updater may append a new data block to the block chain. The new data block may indicate that the operation has been completed. For example, a given operation may involve installing a wing on the airplane. Once the wing is installed, the data updater may append a new data block to the block chain. The new data block may indicate that the wing has been installed.

An appended data block may include a reference to a first data block of the block chain. The reference to the first data block may identify an origin of the block chain. The appended data block may also refer to an input on which the appended data block depends. The input may include a data block related to the workflow being processed and immediately preceding the appended data block on the block chain.

Upon completion of a given workflow, a final state of that workflow may indicate that the workflow is completed. For example, when the last piece of the airplane is installed, the final state of the workflow may be "complete." Once the block chain is appended to indicate that the workflow is completed, all states and corresponding operations of the workflow are represented on the block chain.

Advantageously, storing a workflow as a finite state machine and using a block chain allows an observer to verify a current state of a given workflow. In this context, an observer may be the workflow processor, a workflow designer, an application executing on a client device or on a server computer, or the like. In one embodiment, the observer may have permission to view one or more states of the workflow and block chain.

Using a block chain also allows the occurrence of a given state of the workflow to be verified externally. That is, each data block in a block chain provides an attestation that a corresponding state of the workflow occurred and that the operation of that state has been satisfied. The attestation that a state occurred may be verified based on a cryptographic link between the data blocks of the block chain. A data block may be appended to the block chain for a completed state of the workflow. The appended data block may be linked to a previous data block in the block chain. Thus, the presence of a data block on the block chain corresponding to a state of the workflow may indicate that the state occurred.

The block chain may also allow detection of a modification to any data in the block chain. For example, when data in the block chain is modified, a hash of that data block may be changes. Thus, a link between that data block and a subsequent data block in the block chain may be broken. The broken link in the block chain may be identified by verifying each link in the block chain.

Each data block of the block chain may be used as an input to a subsequent state of the workflow. Thus, any input may be used to perform the workflow even if the input is not specifically designed to be used by a workflow. For example, a clock application executing on a computing device may be designed to maintain a current time. However, the output of the clock application (e.g., the current time) may not be compatible with the workflow (e.g., an incompatible data type). In that case, the current time may be stored in a data block of the block chain. Thus, the current time on the data block can be used as an input to a given operation of the workflow.

An additional advantage provided by storing a workflow as a finite state machine on a block chain is that a given data block in a first block chain may include a reference to a data block in one or more other block chains. That is, a state of the workflow corresponding to the first block chain may depend on an occurrence of a state of a different workflow.

A given operation in a workflow may depend on a successful completion of a separate workflow. That is, a given data block in a main block chain may include a reference to an identifier of the separate block chain. Rather than referencing a separate block chain, the given data block in the main block chain may include the separate block chain as a state of the corresponding workflow. The separate block chain stored in the given data block may be secured with a shared secret. That is, the separate block chain may be encrypted using the shared secret.

The shared secret may be known by certain parties associated with the separate block chain and a corresponding workflow. The certain parties may have permission to observe one or more states of a workflow corresponding to the separate block chain. However, a third party observer with permission to view the main block chain may not have the shared secret. Thus, the third party observer may be able to view and verify the states of the main block chain, but could not view the states of the separate block chain. In that case, the given data block storing the separate block chain may appear to the observer as a single state that occurred.

The data block storing the separate block chain and the data block including a reference and depending from another block chain or a data block in a separate block chain may be examples of a nested block chain. That is, one or more block chains and corresponding workflows may be nested within a larger block chain and workflow. A nested block chain may increase performance of computing a workflow by decreasing the size of a given workflow into separate and smaller workflows. That is, processing speed of the given workflow may be increased over a single, large workflow.

The nested block chain may also provide increased security as to the details of the corresponding workflow. That is, a block chain corresponding to a smaller nested workflow may be encrypted using a shared secret. The shared secret may be known to parties associated with the workflow, but unknown to third parties. Thus, an observer (e.g., a third party) cannot inspect details of the workflow or corresponding block chain without the shared secret.

FIG. 1 illustrates an example computing environment 100, according to one embodiment. As shown, the computing environment includes a network 105, one or more clients 110 a server computer 120, and a data repository 130. The network 105 may be representative of a cellular network, local area network, or similar network. As illustrated, the server computer 120 includes a workflow processor 122, a data updater 124, and a state based machine 126.

The clients 110 may be representative of a computing platform such as a desktop computer, a laptop computer, a tablet, or a mobile device. A client 110 may be used to generate a workflow. A client 110 may also be used to observe a block chain associated with a workflow to determine a current state of the workflow or verify that a given state has occurred.

The data repository 130 may be representative of a database or other data storage mechanism. The data repository 130 may store one or more workflows and corresponding block chains. Each block chain may be a data structure to record data related to a corresponding workflow. Data in the block chain may be updated by appending a new block or link to the block chain. The new data block may be cryptographically bound to a previous data block in the block chain. That is, a given link in the block chain may contain a cryptographic hash of the block chain from the first data block to the data block immediately preceding the link. Thus, the given link may contain a history of the block chain preceding that link. Once a block chain is created, modification to data in the block chain may damage one or more links or bindings between data blocks in the block chain. Thus, the validity and security of a given block chain may be confirmed based on the cryptographic bindings between the blocks. A modification to the data in the block chain is readily detected by identifying a break in the block chain. For example, modification of data in a given data block may break a link to a subsequent data block that depend on the modified data block.

The workflow processor 122 may obtain a workflow specification from the data repository 130. The workflow processor 122 may locate the workflow specification based on a workflow to be processed to perform a given task. The workflow specification may also be referenced by another workflow being processed by the workflow processor 122. The workflow specification may include each state of the workflow and an operation performed during each state to transition to a next state of the workflow. The workflow specification is described in more detail below with reference to FIG. 2.

The workflow processor 122 may also obtain any data related to the workflow specification from the data repository 130. A location of data related to the workflow specification may be determined based on a mapping. The mapping may indicate a location in the data repository 130 of data related to each workflow specification. For example, data related to a workflow for an invoice to a transaction may include an identity of a buyer, an identity of a seller, an item transferred between the buyer and seller, a price of the item transferred, etc. The related data may be an input to a first state of the workflow.

Upon obtaining a workflow specification and related data, the workflow processor 122 may create a block chain for the workflow. To do so, the workflow processor 122 may combine the workflow specification and any related data into a data block. To combine the workflow specification and related data, the workflow processor 122 may append the related data to the workflow specification. The workflow processor may also identify the workflow specification and the related data as a linked pair. The combined data block may be stored in a first data block of the block chain. The first data block may be referred to as commit zero (C0). The workflow processor 122 may compute a hash of C0. The hash may be used as a universally unique identifier (UUID) of the block chain.

Each data block in the block chain following C0 may refer to C0 (e.g., the UUID of C0) as the origin of the block chain and a corresponding workflow. The reference to C0 allows an observer to identify a current state of a particular workflow. For example, a given block chain may include data from more than one workflows. That is, the block chain may include data blocks corresponding to each state of more than one workflow. To identify a current state of a particular workflow, an observer can look at a most recent data block of a corresponding block chain and identify the workflow from the reference to the first data block of that block chain. Thus, the observer need not re-trace each state of the workflow in reverse to determine an identity of the workflow or block chain.

The creation of the block chain may satisfy a first state of the workflow. In that case, the data updater 124 may update the block chain to indicate that C0 an operation corresponding to C0 is completed. The state based machine 126 may transition from the first state of the workflow to a second state. The data updater 124 may append a new data block to the block chain. The new data block may be referred to as commit one (C1).

The workflow processor 122 may perform an operation corresponding to C1 and the second state of the workflow. An input to a given operation may include an attestation to a previous block in the block chain. The input of the given operation may also include an output from an operation corresponding to a previous state of the workflow. For example, the operation corresponding to C1 may include an attestation to C0. The attestation may indicate that C0 successfully completed (i.e., the block chain was created). Once the workflow processor 122 completes the operation corresponding to C1 (or satisfies a condition of C1), the data updater 124 may update the block chain to indicate that the operation corresponding to C1 completed successfully. The state based machine 126 may transition to the next state of the workflow specification and the data updater 124 may append a new data block (for commit 2 (C2)) to the block chain.

In one embodiment, the input may include a separate block chain referenced by the given operation. That is, the given operation may refer to a block chain separate from the block chain containing the given operation. The separate block chain may correspond to a separate workflow specification and a separate set of inputs.

The workflow processor 122 may continue to perform operations corresponding to each state of the workflow until the workflow is completed and a current state identifies the workflow as "complete." The data updater 124 may also continue to append a data block to the block chain for each state that is satisfied. Further, the state based machine 126 may transition through each state of the workflow. Once a data block appended to the block chain indicates that the workflow is complete, the completed block chain may be stored in the data repository 130.

In one embodiment, a workflow software agent (not shown) executing on a client 110 may be used to generate a workflow and implement the workflow as an application on the client 110. The workflow software agent may generate an initial representation of a workflow state and store that representation on the block chain. Other software agents, each representing an attestation to the occurrence of a state of the workflow may communicate with the workflow software agent to update and verify a current state of the workflow. Upon each update to the current state of the workflow, the workflow software agent may append a data block to the hash chain representing the current state of the workflow.

FIG. 2 illustrates an example workflow specification 200, according to one embodiment. As shown, the workflow specification 200 includes current states 205, operations 210, and new states 215. A workflow processor may obtain a workflow specification to process a workflow. The workflow specification 200 may provide steps to be performed to execute the workflow. The workflow may be executed by performing each step on a state based machine. Each step of the workflow may correspond to an operation 210 to be performed in a current state 205 of the workflow.

At any given time, the state based machine may be in one of the current states 205. To transition out of a current state 205 to another state 215 in the workflow specification 200, the workflow processor performs a corresponding operation. For example, to transition out of the "start" state, the operation of "SimpleInvoice.accept(signature=Ysignature)" is executed. In one embodiment, only one operation allows the state based machine to transition from a given current state to a corresponding new state. That is, the state based machine may not transition out of the current state until the workflow processor successfully performs a corresponding operation.

Returning to the invoice example discussed above, upon obtaining the workflow specification, the state based machine is in an initialized state as shown by the current state of "init." The workflow processor may execute the corresponding operation to create a workflow for the invoice. Once the workflow is created, a data updater may update a block chain for the workflow to indicate that the creation operation completed successfully. The state based machine may also transition to the "start" state.

The workflow processor may execute an operation for a buyer (Y) to accept an offer made by a seller (X). This operation is illustrated as the operation "SimpleInvoice.accept(signature=Ysignature)" as shown in FIG. 2. Execution of this operation may involve the workflow processor accepting the offer on behalf of the buyer (Y). Executing the operation may also involve waiting until the workflow processor receives acceptance from the buyer (Y). That is, the execution of the operation may pertain to an active or a passive execution.

Once the operation for the buyer (Y) to accept the offer is successfully completed, the data updater may append a data block to the block chain. The appended data block may be referred to as commit one (C1). The state based machine may transition from the "start" state to the "accepted" state.

While the state based machine is in the "accepted" state, the workflow processor may execute an operation to ship one or more items (e.g., goods) from the seller (X) to the buyer (Y). As discussed above, the state based machine may not transition from the "accepted" state to a "shipped" state until the one or more items have been shipped. The workflow processor may execute the operation to ship the one or more items or may wait to receive a confirmation that the one or more items have been shipped.

When the one or more items have shipped, the data updater may append a data block to the block chain. The appended data block may be referred to as commit two (C2) and indicate that the one or more items have been successfully shipped to the buyer (Y). The state based machine may transition to the "shipped" state once the operation corresponding to the "accepted" state is completed.

The workflow processor may continue to execute an operation in each of the remaining states (e.g., received, pay, paid, and complete) until the state based machine is in the "complete" state. The data updater may append a data block to the block chain for each state. The appended data blocks may indicate that the operation corresponding to each state has occurred. Once the state based machine transitions to a state that indicates the workflow is complete, the block chain may be stored in a data repository. A mapping may also be updated to associate the block chain with the corresponding workflow specification.

Figure 3:
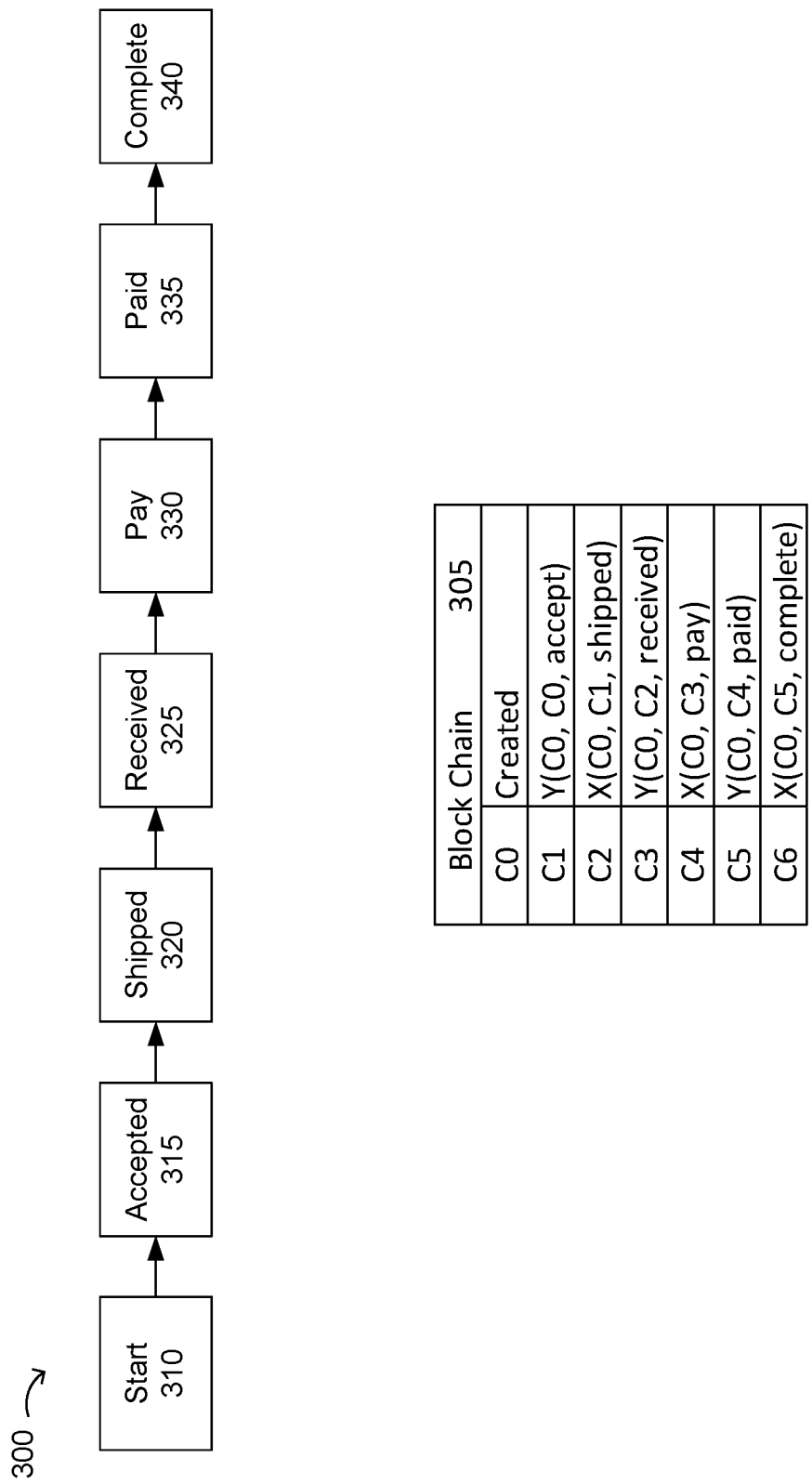
FIG. 3 illustrates an example workflow and a corresponding block chain, according to one embodiment.

FIG. 3 illustrates an example workflow 300 and a corresponding block chain 305, according to one embodiment. As discussed above, a workflow processor may obtain a workflow specification and data related to the workflow. The workflow specification may provide one or more states of a state based machine. To transition from a given state in the workflow specification (i.e., a step in the workflow 300) to a next state, the workflow specification may provide an operation to be satisfied. In one embodiment, the state based machine transitions to the next state upon the successful execution or completion of the operation corresponding to the current state of the state based machine.

The workflow illustrated in FIG. 3 may correspond to a given workflow specification obtained by the workflow processor. Once obtained, the workflow processor may create a block chain. A first data block of the block chain may indicate that the block chain has been created. The single data block may correspond to commit zero (C0) as shown in the block chain 305. A hash of C0 may be used as a UUID for the block chain 305. As each step in the workflow 300 is completed, a data block may be appended to the block chain 305 as shown by C1-C6. Each data block of the block chain 305 may include a reference to the first data block in the clock chain (C0). This reference may be used to identify the block chain 305 associated with each of the data blocks.

As illustrated, workflow 300 may be associated with an invoice for a transaction between a seller (X) and a buyer (Y). The workflow 300 may correspond to the workflow specification as described with reference to FIG. 2. Once the block chain is created, the workflow 300 begins at a start state 310. That is, the start state 310 is the current state of the state based machine. To transition the state based machine from the start state 310 to the accepted state 315, the workflow specification may provide that an operation be satisfied.

To satisfy the operation of the start state 310, the buyer (Y) may accept an offer from the seller (X) to purchase an item(s). Upon acceptance of the buyer (Y), the state based machine may transition to the accepted state 315. A data updater may append a new data block to the block chain 305, which indicates that the buyer (Y) accepted the offer. The new data block may be represented by C1 in the block chain 305. The new data block (C1) may include a first and a second reference to the C0 data block. The first reference to C0 may identify an origin of the current workflow. The second reference to C0 may identify a commit or data block upon which the new data block depends.

An operation to be satisfied in the accepted state 315 may require the seller (X) to ship the item(s) purchased by the buyer (Y). Once the item(s) is shipped, the state based machine transitions to the shipped state 320. The data updater appends a data block (C2) to the block chain 305. The C2 data block indicates that the seller (X) has shipped the item(s) related to the invoice. The C2 data block may refer to the C0 data block as the origin of the workflow and the C1 data block as the data block from which C2 depends, as shown in block chain 305.

The state based machine may remain in the shipped state 320 until an operation corresponding to that state is satisfied. The operation of the shipped state may be satisfied when the buyer (Y) receives the item(s) purchased from and shipped by the seller (X). In addition to receiving the item(s), the operation may be satisfied upon the buyer (Y) accepting or approving the shipment of the item(s). Upon receipt of the item(s), the state based machine transitions from the shipped state 320 to the received state 325. The data updater appends a data block to the block chain 305. The appended data block may refer to C3 as shown in the block chain 305. As shown, the C3 data block refers to the C0 data block as the origin of the workflow and C2 as the data block from which C3 depends.

An operation in the received state 325 may be satisfied when the seller (X) invoices the buyer (Y) for the item(s). Upon invoicing for the received item(s), the state based machine transitions to the pay state 330. Accordingly, the data updater appends a data block (C4) to the block chain 305. As shown, the C4 data block refers to C0 as the origin of the block chain 305. The C4 data block also refers to C3 as the data block from which C4 depends.

An operation of the pay state 330 may be satisfied upon the payment for the item(s). Once payment for the item(s) is complete, the state based machine transitions to the paid state 335. The data updater appends the block chain to include a data block (C5) which indicates that the invoice has been paid. The C5 data block refers to the C0 block as the origin of the workflow and the C4 data block from which C5 depends.

When the seller (X) receives payment for the item(s), the state based machine transitions to the complete state 340. Accordingly, the data updater appends a data block (C6) to the block chain 305. The appended data block C6 may indicate that the workflow for the invoice is complete. As shown, the C6 data block may refer to C0 as the origin of the workflow and the C5 data block from which the C6 data block depends. Once the current state of the state based machine is the complete state 340, the block chain for the workflow is complete and may be stored in a data repository.

Figure 4:
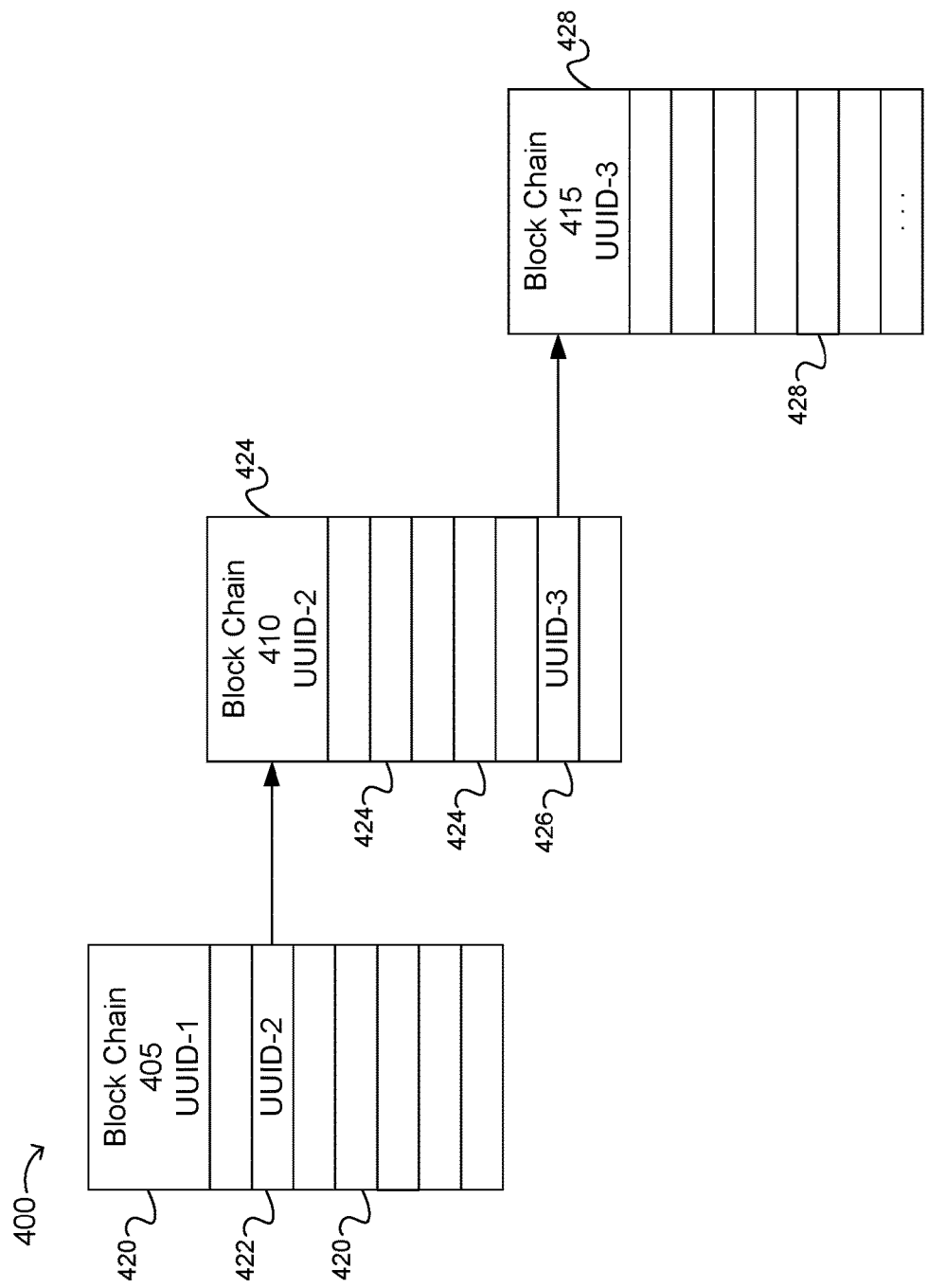
FIG. 4 illustrates a nested block chain, according to one embodiment.

FIG. 4 illustrates a nested block chain 400, according to one embodiment. As shown, the nested block chain includes three separate block chains 405, 410 and 415. Each of the separate block chains 405, 410 and 415 each contain data blocks 420, 422, 424, 426, and 428. Each data block of a block chain (e.g., 420, 424, and 428) may include an attestation that an operation for a corresponding state of an associated workflow was successful. Thus, each data block of a given block chain may correspond to at least one state of a workflow.

A workflow processor may compute a unique identifier (UUID) for each block chain. To do so, the workflow processor may compute a hash of a first data block in the block chain. Each data block in a given block chain may include a reference to a first data block of that block chain. That is, each data block in the given block chain may reference the UUID for that block chain. For example, each data block in block chain 405 may include a reference to UUID-1. Similarly, each data block in block chain 410 may include a reference to UUID-2, and each data block in block chain 415 may include a reference to UUID-3.

The reference in each data block to the UUID of the block chain may allow an observer to identify a current state of a given workflow or state based machine based on a most recent update to the block chain. For example, a data reference to the UUID of the block chain may allow an observer to easily determine a block chain and workflow corresponding to the UUID. Once the UUID of a block chain is identified, the observer may determine a corresponding workflow from a mapping.

A given data block in a block chain may refer to a UUID of a separate block chain. That is, a given operation of a workflow may be dependent on an operation of another workflow. For example, as shown, data block 422 of block chain 405 refers to a UUID of block chain 410 (e.g., UUID-2). Thus, a state of a workflow corresponding to block chain 405 may depend on an operation of or an output from a workflow corresponding to block chain 410. The operation corresponding to data block 422 may specify that a particular output be received from the block chain with UUID-2 (i.e., block chain 410). The particular output may involve an attestation that block chain 410 completed successfully, a particular type of output, a particular value, etc.

As operations of the workflow corresponding to block chain 410 are processed, a corresponding data block is appended to the block chain 410. An operation corresponding to data block 426 may include a reference to block chain 415. That is, the operation corresponding to data block 426 may not refer to a prior operation in the workflow. Rather, the operation of data block 426 may refer to a UUID of block chain 415 (e.g., UUID-3). In that case, the data block 426 may refer to block chain 415 rather than a preceding data block in block chain 410. Thus, an operation of the workflow corresponding to data block 426 may depend on an output of block chain 415.

Figure 5:
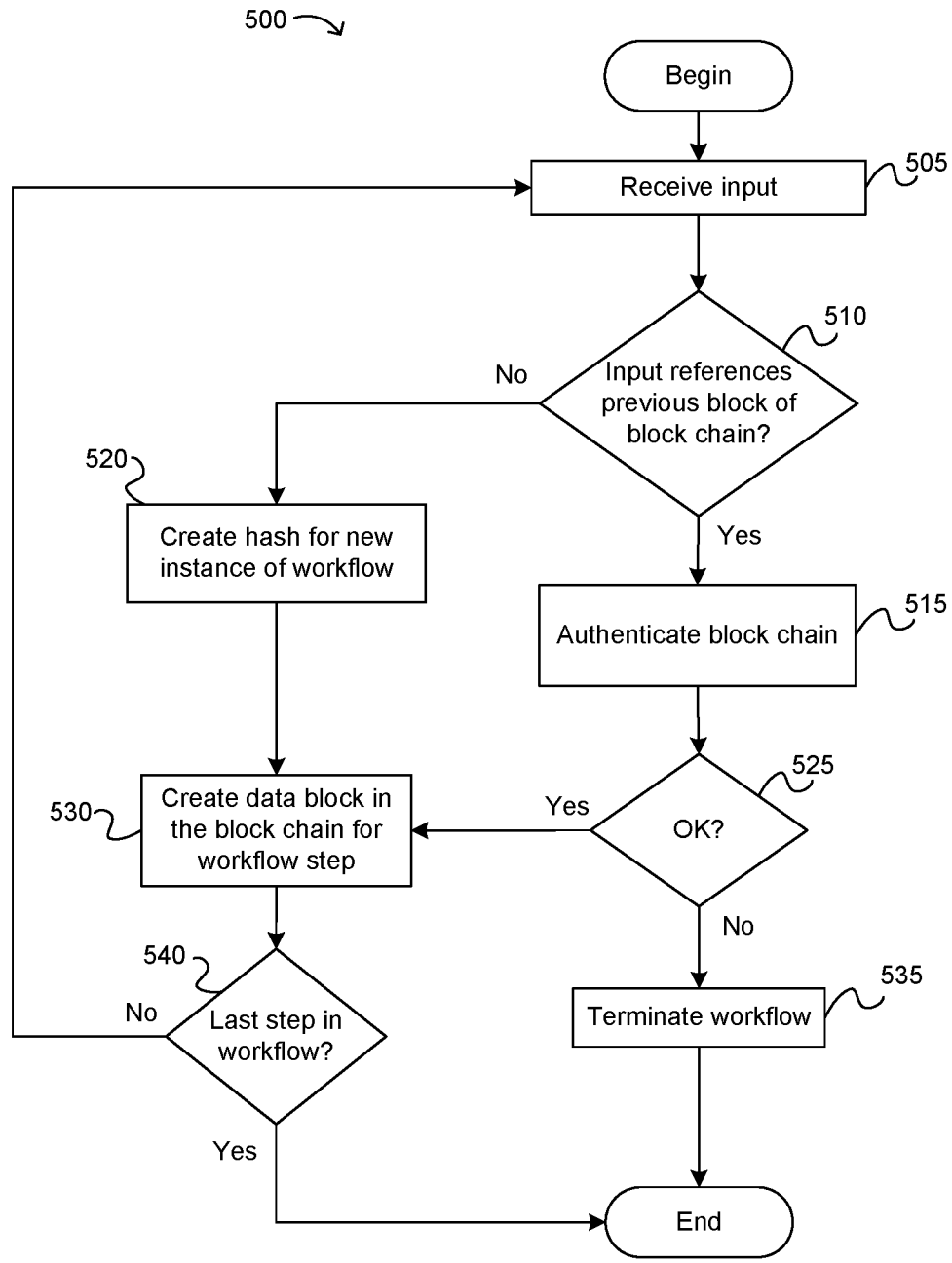
FIG. 5 illustrates a method for generating a block chain for a workflow, according to one embodiment.

FIG. 5 illustrates a method 500 for generating a block chain for a workflow, according to one embodiment. As shown, the method 500 begins at step 505, where a workflow processor receives an input. If a block chain has not been created for the workflow, the input may include a workflow specification and data related to that workflow. If a block chain has been created for the workflow, the input may include an attestation that an operation of the workflow step corresponding to the previous data block successfully completed.

At step 510, the workflow processor determines whether the input references a previous data block in the block chain. If the input includes the workflow specification and related data, the input may not reference a previous block in the block chain. In that case, the workflow processor combines the input of a workflow specification and data related to that workflow. The workflow processor may determine a hash of the combined data using a cryptographic hash function at step 520. The hash may be used as a UUID of the block chain.

If the input at step 510 includes an attestation that a previous operation of the workflow corresponding to the previous data block successfully completed, the input refers to a previous data block in the block chain. At step 515, the workflow processor authenticates the block chain. To do so, the workflow processor may verify the links between each block of the block chain. A link in the block chain may include a hash of the block chain preceding the link. That is, a given link may include a hash of the block chain from the first data block to the data block immediately preceding that link.

Thus, to verify a link in the block chain, the workflow processor may determine a hash of the block chain from the first data block to the data block preceding the link. The workflow processor may compare the determined hash to the hash stored in the link. A difference between the hashes may indicate that at data in at least one data block preceding the link has been modified. Verifying a given link in the block chain ensures that no data has been modified in one or more data blocks preceding that link.

At step 525, the workflow processor determines whether the authentication of the block chain, completed at step 515, was successful. Upon determining the authentication was successful, the workflow processor creates a data block in the block chain at step 530. The created data block may correspond to an operation in the workflow being analyzed.

If the input to step 530 is a hash from step 520 of the workflow specification and related data, the data block created at step 530 may be the first data block in the block chain. Thus, creation of the data block may also create the block chain for the workflow. The created data block may include an attestation that the corresponding operation was completed successfully. The data block may also include a reference to the first data block in the block chain as well as a data block immediately preceding the created data block in the block chain. A data updater may append the created data block to the block chain.

If the workflow processor determines, at step 525, that the authentication of the block chain at step 515 failed, the workflow processor terminates the workflow at step 535. At step 540, the workflow processor determines whether the created data block corresponds to the last step in the workflow. If not, the workflow processor receives an input at step 505. The steps of method 500 continue to repeat until an authentication of the block chain fails or a data block appended to the block chain corresponds to the last step in the workflow.

Figure 6:
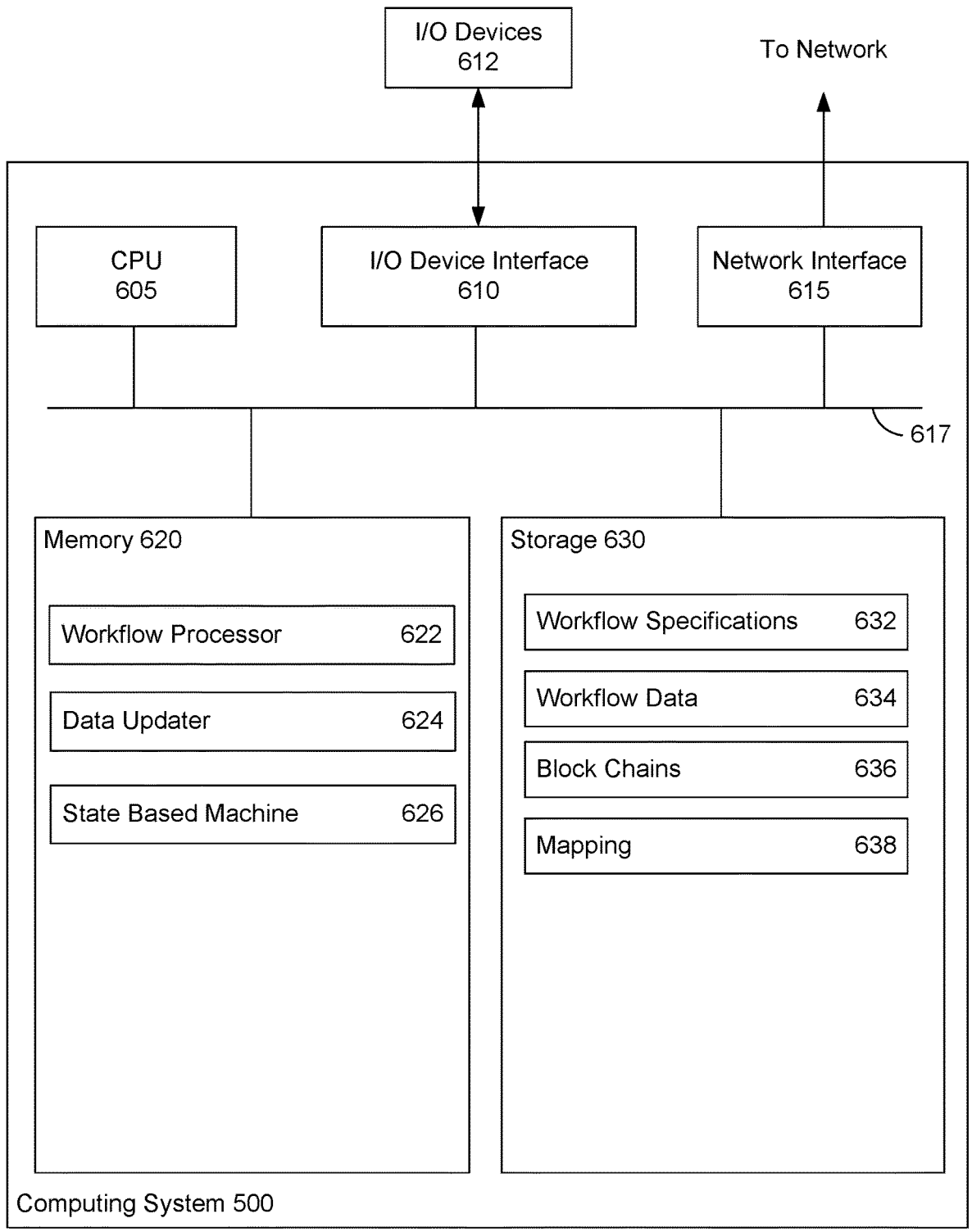
FIG. 6 illustrates an example computing system configured to generate a block chain from a workflow, according to one embodiment.

FIG. 6 illustrates an example computing system 600 configured to generate a block chain from a workflow, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, mouse devices, image capture devices, etc.) to the computing system 600. Further, the computing elements shown in computing system 600 may correspond to a physical computing system (e.g., a system in a data center) or may be a virtual computing instance executing within a computing cloud.

The CPU 605 retrieves and executes programming instructions stored in the memory 620 as well as stored in the storage 630. The bus 617 is used to transmit programming instructions and application data between the CPU 605, I/O device interface 610, storage 630, network interface 615, and memory 620. Note, CPU 605 is included to be representative of a single CPU, multiple CPUs, a single CPU having multiple processing cores, and the like, and the memory 620 is generally included to be representative of a random access memory. The storage 630 may be a disk drive or flash storage device. Although shown as a single unit, the storage 630 may be a combination of fixed and/or removable storage devices, such as fixed disc drives, removable memory cards, optical storage, network attached storage (NAS), or a storage area-network (SAN).

As shown, storage 630 includes workflow specifications 632, workflow data 634, and block chains 636. The workflow data 634 may include data related to each workflow specification in the workflow specifications 632. The block chains 636 may include a block chain for each workflow specification in the workflow specifications 632. The storage 630 may also include a mapping 638. The mapping may provide a link between each of the workflow specifications 632, the workflow data 634, and the block chains 636. The mapping may be used to determine a location a given workflow specification, related workflow data, and a corresponding block chain.

Illustratively, the memory 620 includes a workflow processor 622, a data updater 624, and a state based machine 626. In certain aspects, these components may correspond to the components of the server computer described with reference to FIGS. 1-3. For example, the workflow processor 622 may obtain a workflow specification and data related to the workflow specification from workflow specifications 632 and workflow data 634, respectively.

Each workflow specification in workflow specifications 632 may include one or more states and corresponding operations for a given workflow. The workflow data 634 may include data related to each workflow specification in workflow specifications 632. As an example, a given workflow specification may relate to an invoice for a transaction between two or more parties. In that case, the data related to the given workflow may include an identity of the parties involved, an item(s) related to the transaction, a price of the item(s), etc.

Upon obtaining the workflow specification and related data, the workflow processor 622 may create a block chain for the workflow specification. The workflow processor 622 may combine the workflow specification and related data. The workflow processor 622 may store the combined data in a first data block of the block chain. In the block chain, the first data block may be referred to as commit zero (C0). The workflow processor 622 may determine a hash of the combined data, which may be used as a UUID of the block chain.

Each data block in a given block chain may refer to the UUID of that block chain. The reference to the UUID of the block chain associates the data block to the block chain. Thus, an observer can easily identify a block chain associated with a given data block. Identifying a block chain associated with a given data block may be useful when a block chain includes data blocks associated with more than one workflow. Each data block may also refer to an input on which the data block depends. The referenced input may be a data block immediately preceding the given block in the block chain or a data block in a separate block chain. The input may also be a service that is not related to a workflow. For example, a given data block may refer to an external service that provides a time stamp. If there is a nested block chain, each block chain may refer to a single service to provide a particular piece of data.

Once the block chain is created, the state based machine 626 may transition to a start state of the workflow. The data updater 624 may append a new data block to the block chain. The new data block may be referred to as commit one (C1). The C1 data block may correspond to a first state of the workflow. The C1 data block may include a reference to the C0 data block.

The workflow processor 622 may perform an operation corresponding to the first state of the workflow. An input to the operation may include an attestation that the block chain has been created and hash of the workflow specification and related data has been computed. Upon completion of the operation corresponding to the first state of the workflow, the workflow processor 622 may identify a next state of the workflow. The state based machine 626 may transition to the next state of the workflow and the data updater 624 may append a new data block to the block chain.

The appended data block may be referred to as commit two (C2). The C2 data block may include a reference to the UUID of the block chain (e.g., a hash of the C0 data block). The C2 data block may also include a reference to an input on which the C2 block depends. The input may include a data block on the block chain related to the workflow being processed and immediately preceding the C2 data block (i.e., the C1 data block). The input may also include a data block in a separate block chain. The input may also include a separate block chain or a service external to the workflow. For example, the input may include a time stamp from a service designed to provide a current time.

In one embodiment, an input for a data block on a main block chain may include a separate block chain. In that case, an operation corresponding to a state of the main block chain may specify that a workflow associated with the separate block chain be executed before the state based machine 626 can transition to a next state of the main block chain. The workflow processor 622 may process the separate block chain and associated workflow in a manner similar to that described above.

For example, the workflow processor 622 may obtain a workflow specification associated with the separate block chain. The workflow processor 622 may perform an operation for each state of the separate block chain. Upon successful completion of each state of the separate block chain, the state based machine 626 may transition from a current state of the separate block chain to a next state of the separate block chain. Similarly, the data updater 624 may append a new data block to the separate block chain for each completed state of the separate block chain. The data blocks appended to the separate block chain each may indicate that a corresponding state occurred.

Upon completion of the workflow associated with the separate block chain, the data updater 624 may append a new data block to the main block chain. The appended data block may indicate that the workflow associated with the separate block chain was successfully completed. The workflow processor 622 may continue to complete an operation for each state of the workflow until each state of the workflow has occurred. A final state of the workflow may indicate that the workflow is completed. Upon completion of the workflow, the workflow processor 622 may store the completed block chain in block chains 636.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for managing workflows comprising:
    obtaining, by a processor, a workflow specification, the workflow specification comprising one or more states and one or more operations, each operation of the one or more operations corresponding to at least one of the one or more states, wherein a given output for each given state of the one or more states depends on the given state and a given input;
    generating, by the processor, a block chain for the workflow specification, wherein the block chain comprises an electronic data structure in which blocks are cryptographically linked; and
    for a respective state of the one or more states in the workflow specification:
        identifying, by the processor, an operation of the one or more operations corresponding to the respective state of the workflow;
        receiving, by the processor, an attestation that a separate workflow corresponding to a separate block chain was completed successfully;
        providing, by the processor, as an input to the operation, the attestation that the separate workflow corresponding to the separate block chain was completed successfully;
        determining, by the processor, an output for the respective state, wherein the output comprises an attestation that the operation was completed successfully;
        appending, by the processor, a respective data block to the block chain, the respective data block including a reference to the separate block chain, wherein the respective data block comprises the output for the respective state; and
        transitioning, by the processor, from the respective state to a next state of the one or more states in the workflow specification.

2. The computer-implemented method of claim 1, wherein the respective data block appended to the block chain includes a reference to a universally unique identifier (UUID) of the separate block chain.

3. The computer-implemented method of claim 2, further comprising:
    obtaining, by the processor, a given workflow specification associated with the separate block chain, the given workflow specification associated with the separate block chain containing one or more operations for the given workflow specification associated with the separate block chain; and
    performing, by the processor, an operation corresponding to each of the one or more operations for the given workflow specification associated with the separate block chain.

4. The computer-implemented method of claim 3, wherein the respective data block includes each operation of the one or more operations for the workflow specification associated with the separate block chain.

5. The computer-implemented method of claim 1, wherein a cryptographic hash creates a link between each data block and a preceding data block.

6. The computer-implemented method of claim 5, further comprising authenticating, by the processor, the block chain by verifying links between data blocks in the block chain.

7. The computer-implemented method of claim 1, wherein an input to each of the one or more operations includes at least an attestation to an occurrence of a state corresponding to a preceding operation.

8. The computer-implemented method of claim 1, further comprising:
    computing, by the processor, a hash of the workflow specification and data related to the workflow specification; and
    assigning, by the processor, the hash as an identifier of the block chain.

9. A system for managing workflows, comprising:
    one or more processors; and
    a memory comprising instructions that, when executed by the one or more processors, cause the system to:
        obtain a workflow specification, the workflow specification comprising one or more states and one or more operations, each operation of the one or more operations corresponding to at least one of the one or more states, wherein a given output for each given state of the one or more states depends on the given state and a given input;
        generate a block chain for the workflow specification comprising at least a first data block, wherein the block chain comprises an electronic data structure in which blocks are cryptographically linked;
        store the workflow specification in the first data block; and
        for a respective state of the one or more states in the workflow specification:
            identify an operation of the one or more operations corresponding to the respective state of the workflow;
            receive an attestation that a separate workflow corresponding to a separate block chain was completed successfully;

provide as an input to the operation, the attestation that the separate workflow corresponding to the separate block chain was completed successfully;

determine an output for the respective state, wherein the output comprises an attestation that the operation was completed successfully;

append a respective data block to the block chain, the respective data block including a reference to the separate block chain, wherein the respective data block comprises the output for the respective state; and transition from the respective state to a next state of the one or more states in the workflow specification.

10. The system of claim 9, wherein the respective data block appended to the block chain includes a reference to a universally unique identifier (UUID) of the separate block chain.

11. The system of claim 10, wherein the instructions, when executed by the one or more processors, further cause the system to:

obtain a given workflow specification associated with the separate block chain, the given workflow specification associated with the separate block chain containing one or more operations for the given workflow specification associated with the separate block chain; and perform an operation corresponding to each of the one or more operations for the given workflow specification associated with the separate block chain.

12. The system of claim 11, wherein the respective data block includes each operation of the one or more operations for the workflow specification associated with the separate block chain.

13. The system of claim 10, wherein a cryptographic hash creates a link between each data block and a preceding data block.

14. The system of claim 13, wherein the instructions, when executed by the one or more processors, further cause the system to authenticate the block chain by verifying links between data blocks in the block chain.

15. The system of claim 10, wherein an input to each of the one or more operations includes at least an attestation to an occurrence of a state corresponding to a preceding operation.

16. The system of claim 10, wherein the instructions, when executed by the one or more processors, further cause the system to:

compute a hash of the workflow specification and data related to the workflow specification; and assign the hash as an identifier of the block chain.

17. A computer-implemented method for managing workflows comprising: obtaining, by a processor, a workflow specification, the workflow specification comprising one or more states and one or more operations, each operation of the one or more operations corresponding to at least one of the one or more states, wherein a given output for each given state of the one or more states depends on the given state and a given input; generating, by the processor, a block chain for the workflow specification comprising at least a first data block, wherein the block chain comprises an electronic data structure in which blocks are cryptographically linked; storing, by the processor, the workflow specification in the first data block; and for a respective state of the one or more states in the workflow specification: identifying, by the processor, an operation of the one or more operations corresponding to the respective state of the workflow; receiving, by the processor, an attestation that a separate workflow corresponding to a separate block chain was completed successfully; providing, by the processor, as an input to the operation, the attestation that the separate workflow corresponding to the separate block chain was completed successfully; determining, by the processor, an output for the respective state, wherein the output comprises an attestation that the operation was completed successfully; appending, by the processor, a respective data block to the block chain, the respective data block including a reference to the separate block chain, wherein the respective data block comprises the output for the respective state; and transitioning, by the processor, from the respective state to a next state of the one or more states in the workflow specification.

18. The computer-implemented method of claim 17, wherein the respective data block appended to the block chain includes a reference to a universally unique identifier (UUID) of the separate block chain.

19. The computer-implemented method of claim 18, further comprising:

obtaining, by the processor, a given workflow specification associated with the separate block chain, the given workflow specification associated with the separate block chain containing one or more operations for the given workflow specification associated with the separate block chain; and performing, by the processor, an operation corresponding to each of the one or more operations for the given workflow specification associated with the separate block chain.

20. The computer-implemented method of claim 19, wherein the respective data block includes each operation of the one or more operations for the workflow specification associated with the separate block chain.

* * * * *